US005790958A

United States Patent [19]

McCoy et al.

[11] Patent Number: 5,790,958

[45] Date of Patent: Aug. 4, 1998

[54] RADIO RECEPTION SYSTEM FOR GENERAL PURPOSE COMPUTER

[75] Inventors: Michael S. McCoy, Cerritos; Michael E. Hayworth, Yorba Linda, both of Calif.

[73] Assignee: MMGT Enterprises, Inc., Cerritos, Calif.

[21] Appl. No.: 543,317

[22] Filed: Oct. 16, 1995

[51] Int. Cl.[6] .......... H04B 1/16

[52] U.S. Cl. .......... 455/557; 455/45; 455/161.1; 455/344; 364/705.05

[58] Field of Search .......... 455/88, 89, 90, 455/348, 344, 349, 45, 74, 66, 67.7, 161.2, 161.1, 167.1, 184.1, 185.1, 186.1, 550; 379/57, 58, 556, 557; 340/825.44, 311.1; 364/705.05

[56] References Cited

U.S. PATENT DOCUMENTS

| | | | |
|---|---|---|---|
| 4,777,657 | 10/1988 | Gillaspie | 455/186.1 |
| 4,881,273 | 11/1989 | Koyama et al. | 455/161.2 |
| 5,019,910 | 5/1991 | Filmer | 358/188 |
| 5,063,610 | 11/1991 | Aldawish | 455/45 |
| 5,214,792 | 5/1993 | Aldawish | 455/45 |
| 5,220,682 | 6/1993 | Tomohiro | 455/161.2 |
| 5,249,164 | 9/1993 | Koz | 358/21 R |
| 5,335,276 | 8/1994 | Thompson et al. | 380/21 |
| 5,355,526 | 10/1994 | Berninger | 455/161.2 |
| 5,444,869 | 8/1995 | Stricklin et al. | 455/89 |
| 5,452,356 | 9/1995 | Albert | 380/9 |
| 5,457,815 | 10/1995 | Morewitz | 455/161.1 |
| 5,524,288 | 6/1996 | Monge Navarro et al. | 455/180.4 |
| 5,537,398 | 7/1996 | Siwiak | 370/19 |
| 5,581,576 | 12/1996 | Lanzetta et al. | 375/216 |

OTHER PUBLICATIONS

U.S. RBDS Standard (Specification of the Radio Broadcast Data System) National Radio Systems Committee, Jan. 8, 1993.

*Primary Examiner*—Reinhard J. Eisenzopf
*Assistant Examiner*—Lee Nguyen
*Attorney, Agent, or Firm*—Knobbe, Martens, Olson & Bear, LLP

[57] ABSTRACT

A radio data reception system operates within a host processing system such as a personal computer and receives FM broadcast transmissions encoded with either RDS or MBS digital data modulated upon a subcarrier frequency. The radio data reception system operates in one of three modes to interpret the RDS or MBS digital data. A first mode of operation provides a user of the radio data reception system with complete FM stereo tuner functions displayed on a monitor. The radio data reception system receives and decodes RDS data transmissions in the FM stereo tuner mode and displays the RDS data on the monitor. In second and third modes of operation, the radio data reception system receives and processes MBS digital data. In the second mode of operation, the MBS data is used by the host processing system to monitor pages received by a user of the system. MBS digital data received in the third mode of operation can be compiled and stored into large binary files within the host processing system for later retrieval by a user.

19 Claims, 8 Drawing Sheets

RADIO RECEPTION SYSTEM FOR GENERAL PURPOSE COMPUTER

FIELD OF THE INVENTION

This invention relates generally to apparatus for receiving and decoding modulated data transmitted over a radio broadcast. More specifically, this invention relates to apparatus and methods which are capable of decoding and processing digital and analog information transmitted over an FM frequency using a personal computer.

BACKGROUND OF THE INVENTION

The United States has developed a Radio Broadcast Data System (RBDS) standard for encoding digital data to allow transmission of the digital data on an FM carrier propagated over the airwaves. Radio stations, and other Radio Frequency (RF) generating sites, use the RBDS standard to transmit digital data to recipients of a corresponding FM signal. The RBDS data is transmitted on a subcarrier within an FM broadcaster's allocated bandwidth. The subcarrier is locked in phase to the third harmonic of the 19 kHz pilot tone in stereo broadcasts and located at 57 kHz in mono broadcasts.

The encoding and decoding specification for the "United States RBDS Standard" has been published by the National Radio Systems Committee on Jan. 8, 1993, the entire contents of which, including the Appendices, is incorporated herein by reference as though fully set forth. A copy of the RBDS standard publication can be obtained by contacting the National Association of Broadcasters located at 1771 N. Street, N.W., Washington, D.C. 20036. The RBDS standard encompasses several data broadcast and data technologies including the Radio Data System (RDS) and the Telecommunications Specification known as "MBS", both originally developed in Europe. Either of the RDS or MBS standards can be used to encode and decode digital data on an FM multiplexed signal for transmission and reception, respectively, over the airwaves.

The RDS and MBS standards differ in the way digital data is configured or formatted for transmission. Data transmitted via RDS is separated into various segments, called "groups", wherein each group represents a specific type of information, such as traffic information, emergency information, station information, etc. On the other hand, data transmitted via MBS is not specifically segmented and thus its transmission format can be customized according to the needs of a station operator.

Both the RDS and MBS methods, as subsets of the RBDS standard, are in use in the United States by various radio stations. Data transmission by the RDS method allows radio stations to transmit pertinent information related to the FM signal such as station call letters, song titles, music type, etc. Since this information is transmitted under the known RDS format, the data can be captured and then decoded using the RBDS standard specification. Some of the more sophisticated car radios have an RDS data decoding capability.

MBS data transmission is also used by various radio stations across North America. One group of nationwide stations utilizes MBS transmission to create a paging network based on FM radio. Such a system operates similarly to cellular paging networks, except that the paging signal is transmitted via FM radio. When a pager number is to be paged, an MBS digital signal is broadcast over the network of radio stations. Since MBS data is uniquely formatted by the sending station, it is only useful to those MBS receivers which are programmed to decipher a particular transmission.

Use of the RBDS data transmission methods is one way a provider of information can transmit data over a wide geographical region to millions of potential recipients. Traditional methods for transmitting digital data to a large number of people include those which operate over the telephone lines. Such methods are commonly termed "on-line" services such as Compuserve® or America On-Line. Today's personal computers (PCs) have an ever-expanding range of memory capacity and processing power which makes these services valuable informational tools. However, such on-line services have a monthly fee and usage charge for access to the large database of information on such services.

Often, the PC user who accesses an on-line service may be seeking only "basic" services such as weather information, stock market information, traffic information, or the current news. Thus, there is a need for a personal computer which can provide information access to the PC user in a convenient manner and at substantially reduced cost.

SUMMARY OF THE INVENTION

The present invention combines a radio data reception system with a personal computer. The radio data reception system receives FM broadcasts and decodes digital data modulated along with the FM broadcasts. Receipt of FM radio data within a personal computer allows a user to take advantage of the processing and storage capability of modern personal computers. An FM stereo tuner is included to provide the user with full stereo functionality in addition to radio data reception.

The radio data reception system operates in accordance with the RBDS standard to receive both RDS and MBS data. The radio data reception system contains its own microprocessor which can automatically synchronize and interpret either RDS or MBS data. Operation of the radio data reception system is performed either manually through user interaction, or automatically based on predetermined settings.

The radio data reception system can operate in one of several user-selectable modes. A first mode of operation is that of a stereo tuner in which full stereo functions are presented to a user on a monitor. In addition to traditional stereo functions, the user may store audio information directly to a host computer or other associated system. While in the stereo tuner mode, the radio data reception system will read and decode any RDS data transmitted by the particular radio station which is tuned by the user. This RDS data is then processed and displayed to the user.

A second mode of operation for the radio data reception system is a page receiving mode in which the radio data reception system receives and processes MBS formatted data. In this mode, the personal computer can receive a page and because of the processing and storage capability of personal computers, large amounts of information transmitted with the page can be instantly displayed to the user or stored for later retrieval. The paging mode is particularly advantageous for users who travel and operate laptop or portable computers. Moreover, depending on the particular transmitting stations, a much wider paging service area can be offered over traditional cellular pagers.

A third mode of operation for the radio data reception system is an MBS data receipt and storage mode. In this mode, unlike the MBS paging mode, digital data is continuously read, processed and stored by the host computer. To receive and process the data, internal programming of the radio data reception system decodes and formats the MBS data in accordance with the encoding method used by the associated radio station. This allows for proprietary information transfer to users of the radio data reception system.

Transfer of data in this third mode can be coordinated with existing MBS stations which currently transmit paging information. Specifically, FM paging radio stations typically have peak paging hours during morning and afternoon rush hours. Other portions of the day and night having little or no paging activity. These time periods can be used to transmit additional information to a user of the radio data reception system. Such information can include items currently available on popular on-line services, such as news and weather reports.

Moreover, because the radio data reception system can decode both RDS or MBS data, the system can operate in multiple modes simultaneously to detect both RDS and MBS data which may be multiplexed and transmitted by a single radio station.

An alternative embodiment of the present invention uses a plurality of tuners enabling the user to receive multiple FM radio signals at the same time. This also allows the user to operate the radio data reception system in multiple modes while maintaining maximum data throughput. Thus, a user could be listening to the radio, listening for a page, or downloading news and other information concurrently. The capabilities of personal computers and other personal processing devices allows for effective dual-tuner operation of the radio data reception system.

DETAILED DESCRIPTION OF THE PREFERRED EMBODIMENT

Figure 1:
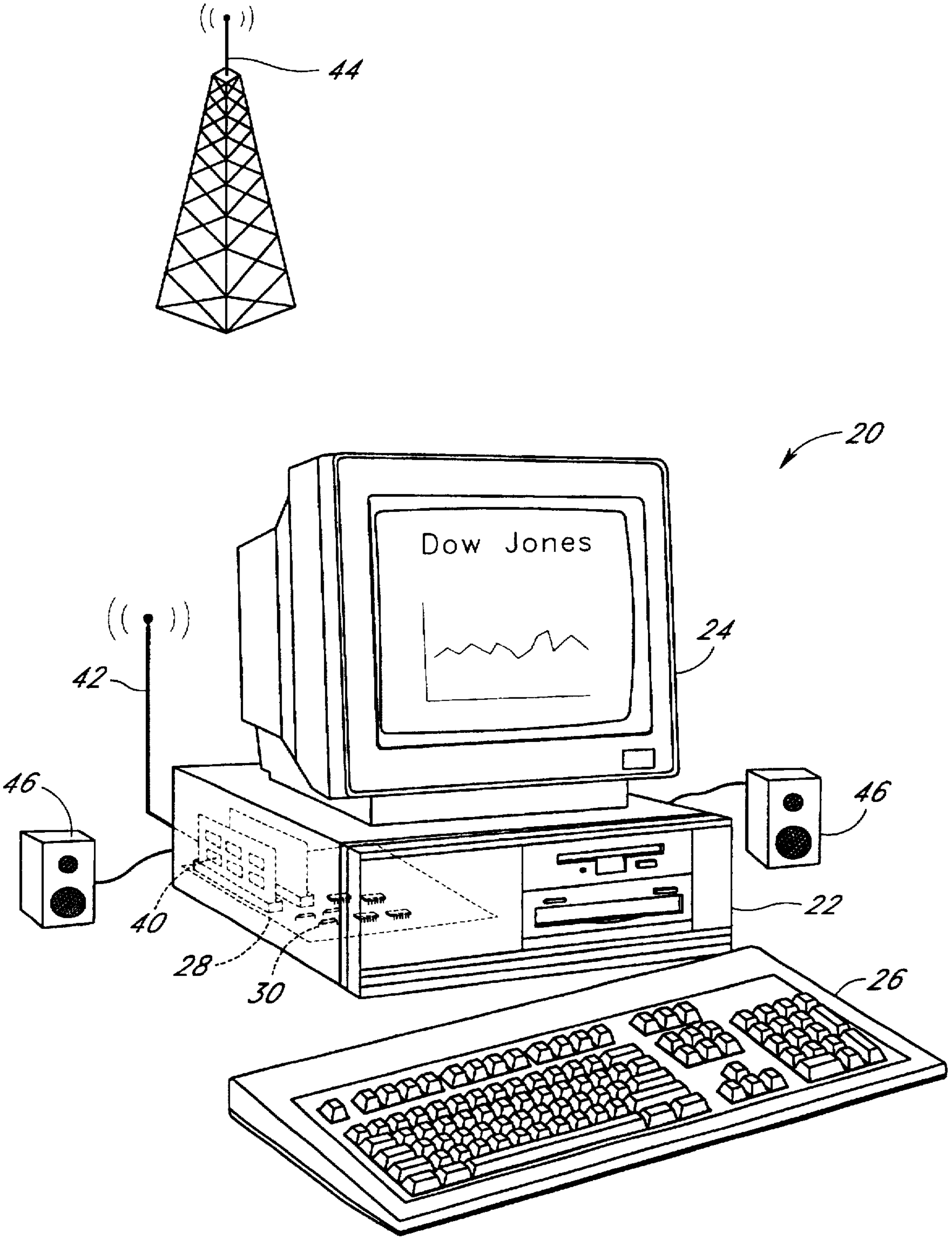
FIG. 1 is a perspective view of a personal computer having a radio data reception system for receiving data signals over the airwaves.

FIG. 1 is a perspective view of a personal computer 20 having a housing 22 which is connected to a monitor 24 and a keyboard 26. The housing 22 contains a motherboard 28 upon which various circuit components 30 of the computer 20 are mounted. A radio data reception system comprising an FM tuner and digital data decoder card 40 is connected to the motherboard 28 as shown. A reception antenna 42 is attached to the data decoder card 40 for receiving FM signals transmitted over the airwaves from a second antenna 44. In accordance with a preferred embodiment of the present invention, FM signals may be processed by the computer 20 for playback of audio signals through a pair of speakers 46 attached to the computer 20. The computer 20 also processes any RDS or MBS digital data received from the FM transmission. This data may be displayed on the monitor 24 to an operator.

The content of the digital data received by the card 40 is determined by the particular FM signal received, and is later decoded according to the Radio Broadcast Data System (RBDS) standard used by various radio stations. Many FM radio stations throughout the country currently use the RDS standard to transmit station information, song-title information, traffic information, etc. The MBS standard may also be used by FM stations to transmit data in the form of paging information, daily news, etc., over the airwaves to a computer which is equipped with the radio data reception system disclosed herein. Accordingly, the present invention creates a complete FM stereo tuner and RBDS data decoding system within a personal computer.

To assist the reader in understanding the operations of the present invention, a brief discussion of the digital data transmission methods is in order. Digital data transmitted using the RBDS system is formatted as a Radio Data System (RDS) segment or an MBS segment. Individual RDS data bits are configured in a specific format consisting of 104-bit groups comprised of four 26-bit blocks. In the RDS standard, there can be a total of 16 separate group types each representing different types of information. The various 104-bit group types which are currently defined in the RDS standard are listed below:

TABLE I

| Group Type | Applications |
|---|---|
| 0 | Basic tuning and switching information |
| 1 | Program item No. and slow labelling codes |
| 2 | Radio text |
| 3 | Location and Navigation |
| 4 | Clock-time and date |
| 5 | Transparent data channels |
| 6 | In-house applications |
| 7 | Radio paging |
| 8 | Traffic Message Channel |
| 9 | Emergency warning systems |
| 10 | Program Type Name |
| 11–13 | Undefined |
| 14 | Enhanced other networks information |
| 15 | Fast basic tuning and switching information |

Figure 2:
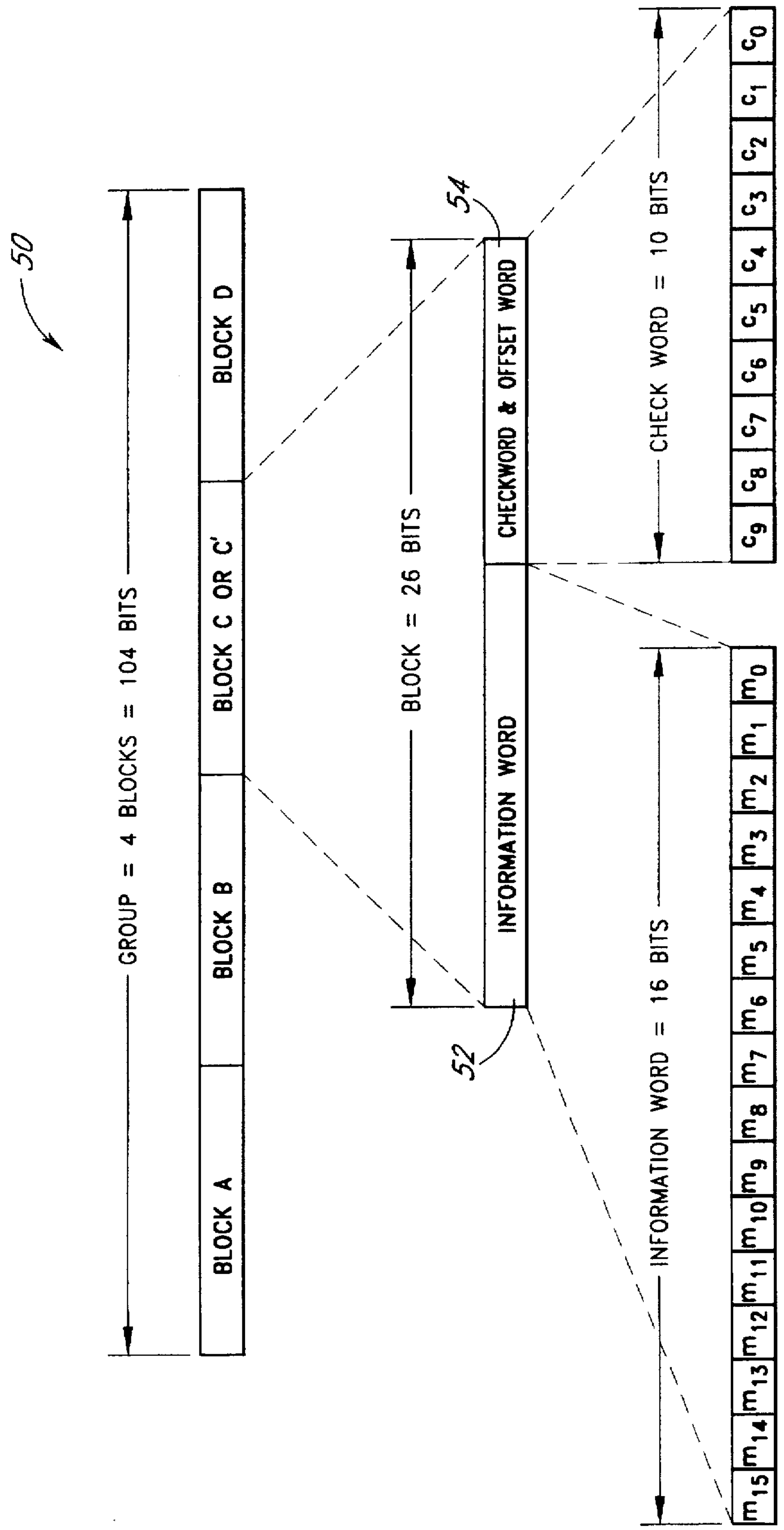
Fig.2 (PRIOR ART)
FIG. 2 is a diagram depicting a segment of RBDS data and its component blocks.

FIG. 2 depicts a standard RDS group of digital data and its constituent blocks. As shown in FIG. 2, within a specific 104-bit group type 50, there are four consecutive blocks labelled A, B, C or C', and D. Each block contains a 16-bit information word 52 and a 10-bit checkword 54. The RDS standard sets forth a specific message format and addressing scheme for the various group types. For example, the overall group type 50 is determined by the first four bits of block B while the first sixteen bits of block A represent a particular station's program identification code.

As previously stated, there is no specific formatting standard for MBS data. Instead, the encoding and decoding formats are chosen by the transmitting station. Remaining details concerning the RDS or MBS data transmission standards are common to one of ordinary skill in the art, and are explained in detail in the United States RBDS standard incorporated herein by reference.

Figure 3:
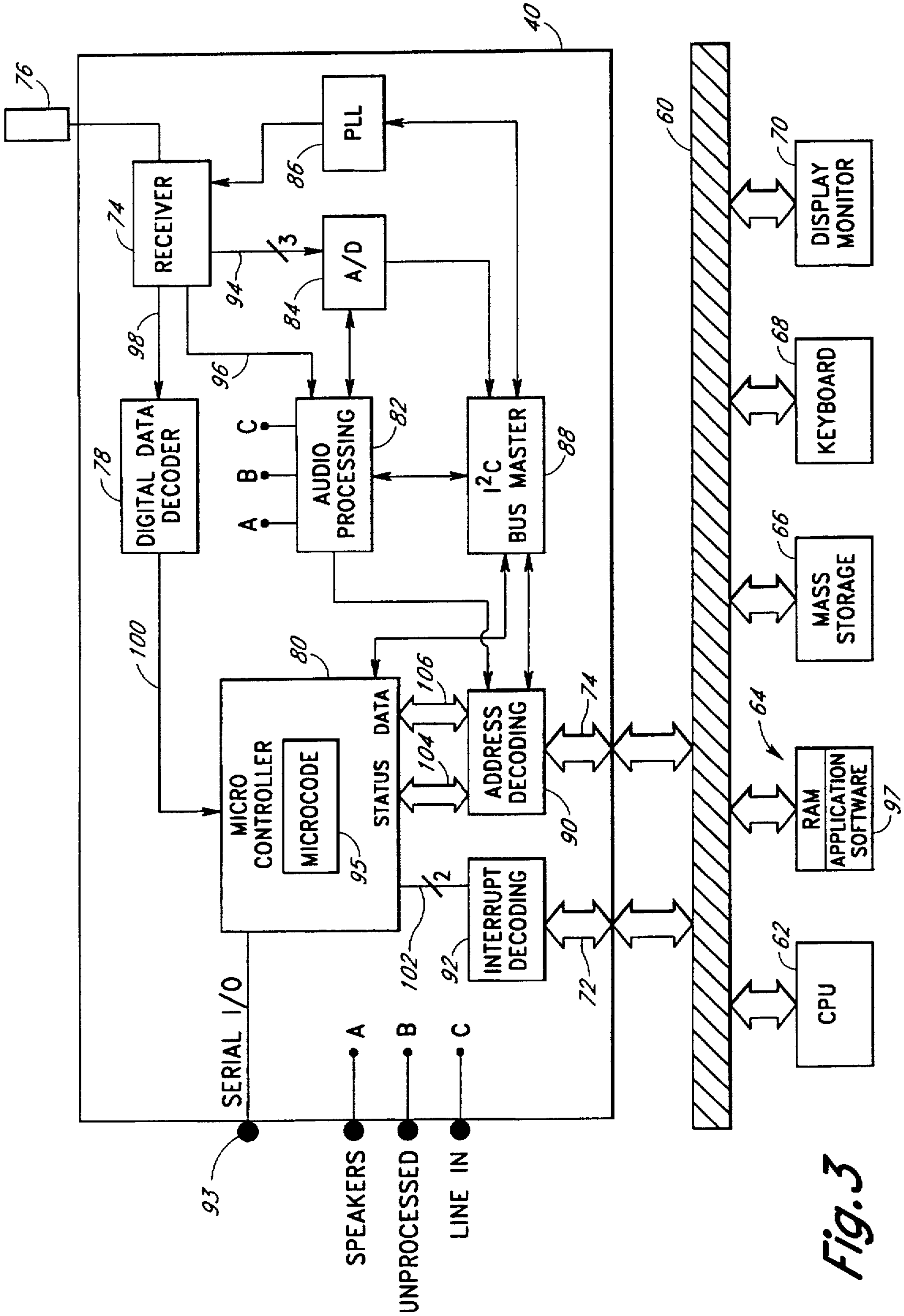
FIG. 3 is a schematic block diagram depicting the components of a radio data reception system for use in a personal computer.

Referring now to FIG. 3, the radio data reception system comprises the FM tuner and processing card 40 which is connected via a bus 60, such as an ISA bus, to the components of a personal computer. The main personal computer components include a central processing unit (CPU) 62, a RAM memory unit 64, a mass storage unit 66 such as a hard disk drive, a keyboard 68, and a monitor 70. It is also possible to externally mount the card 40 outside of the personal computer 20 (shown in FIG. 1) and connect the card 40 to the computer 20 via an external interface.

The processing card 40 interfaces with the bus 60 through a group of interrupt lines 72 and a group of address and data lines 74. The card 40 comprises a receiver and tuner unit 74 which is connected to an antenna 76. The receiver 74 is connected to a digital data decoder 78 which is in turn connected to a digital data processor, or microcontroller 80. The receiver 74 is also connected to an audio processing unit 82, an analog to digital converter 84, and a phased loop logic (PLL) circuit 84. A local bus controller 88, such as an $I^2C$ bus master, is connected to the devices 80, 82, 84, and 86 as shown, and is also connected to address decoding circuitry 90. The address decoding circuitry 90 and interrupt decoding circuitry 92 are both connected to the microcontroller 80.

The card 40 also contains an external serial port 93 connected to the microcontroller 80, and three audio ports, labelled A–C, connected to the audio processing unit 82. Audio port A is an audio-output port for connection to external speakers; audio port B is an unprocessed audio port for connection to a sound card or other audio device; and audio port C is an input port or "line-in" port for receiving audio signals to be processed by the audio unit 82.

In operation, the processing card 40 performs stand-alone functions dictated by software, or microcode 95, which is resident within the microcontroller 80. The microcontroller 80 may be a standard 8051 device operating at 12 megahertz. Additional functions of the card 40, as well as processing functions of the radio data reception system, are controlled by application software 97 resident in the associated PC which may be stored in the mass storage device 66 and loaded into the PC's memory unit 64 during operation. By sharing processing functions between the card microcontroller 80, and the computer CPU 62, performance of the overall system can be enhanced and optimized to take advantage of the more powerful host CPU 62.

Communication between the various devices of the card 40 is accomplished via a local 2-bit $I^2C$ bus. In a preferred embodiment, local bus access is controlled through the $I^2C$ bus master chip 88. Although the embodiment shown in FIG. 3 uses a specific $I^2C$ bus master, it is possible to configure the microcontroller 80 as the bus master thereby eliminating the need for a separate bus master chip 88.

Tuning information received from the application software 97, via the bus 60, is routed through the $I^2C$ bus master 88 and to the PLL 86. Similarly, audio processing parameters are routed to the audio processing unit 82 via the bus master 88. The receiver 74 locks on to the desired FM station and emits corresponding signals along paths 94, 96 and 98.

Along the data path 94, three separate signals are transmitted indicating the strength of the detected audio signal and the levels of the left and right stereo signals. This information is then digitized by the A/D converter 84 and then transferred back through the bus 60 for processing and display by the application software 97. The signal containing the analog audio information is transmitted along the path 96 for further processing by the circuitry 82 before being output to the audio port A. The audio signal is also transmitted along path 98 to the digital data decoder 78. The digital data decoder 98 demodulates and decodes the digital RBDS data (either RDS or MBS) associated with the particular FM stationed which is tuned by the receiver 74.

The digital data decoder 78 may be any number of standard decoding devices. In a preferred embodiment, a Phillips brand model SA6574T is used. The decoder 78 outputs a continuous digital data stream, and corresponding clock signal, along a path 100 which is received by the microcontroller 80 for analysis and processing.

The microprocessor performs a sequence of operations to identify, decode, store, and eventually transmit the RDS or MBS data along the bus 60 to the host computer. In accordance with a preferred embodiment, if the microcontroller 80 detects RDS data, it will automatically decode the various data groups of RDS data outlined in Table I above. Similarly, if the microcontroller 80 detects MBS data, it will automatically decode the data as defined by the appropriate MBS data structure.

Communication between the microcontroller 80 and the host personal computer, or other display/processing system, is accomplished via a status port having corresponding signal lines 104, and a data port having corresponding signal lines 106. Depending upon the particular microcontroller 80 selected, the data and status ports may be on-board, or implemented with an external I/O device. In a preferred embodiment, the data and status ports are 8-bit registers and the signal lines 104 and 106 each contain a corresponding 8 individual signal paths. The status signal lines 104 serve to identify the current transfer operation performed by the microcontroller 80, and the data signal lines 106 transfer the data from the microcontroller 80 to the host computer. The data and status information from the corresponding ports is decoded by the address decoding circuitry 90 and presented to the bus 60 for transfer to the host computer.

Interrupt decoding information is transferred from the microcontroller 80 to the interrupt decoding circuitry 92 along a path 102. When the microcontroller wishes to interrupt the host computer, interrupt signals are processed by the decoding circuitry 92 and presented to the bus 60 over the signal lines 72.

Data transfer between the microcontroller 80 and the host computer can be accomplished by an "interrupt" method or a strict "polling" method. These methods are discussed in more detail in connection with FIG. 5.

Because the card 40 will be exposed to the surrounding circuitry of the host computer, RF shielding of the card or individual components may be required to avoid interference with the audio information processed by the card 40.

In accordance with a preferred embodiment, use of the radio data reception system in the stereo-tuner mode provides the user with a host of choices graphically presented on the display monitor 70. The functions and user options of the stereo mode will be discussed first to provide the reader with a background for understanding the software instructions outlined in the flow charts of FIGS. 5–7.

Figure 4:
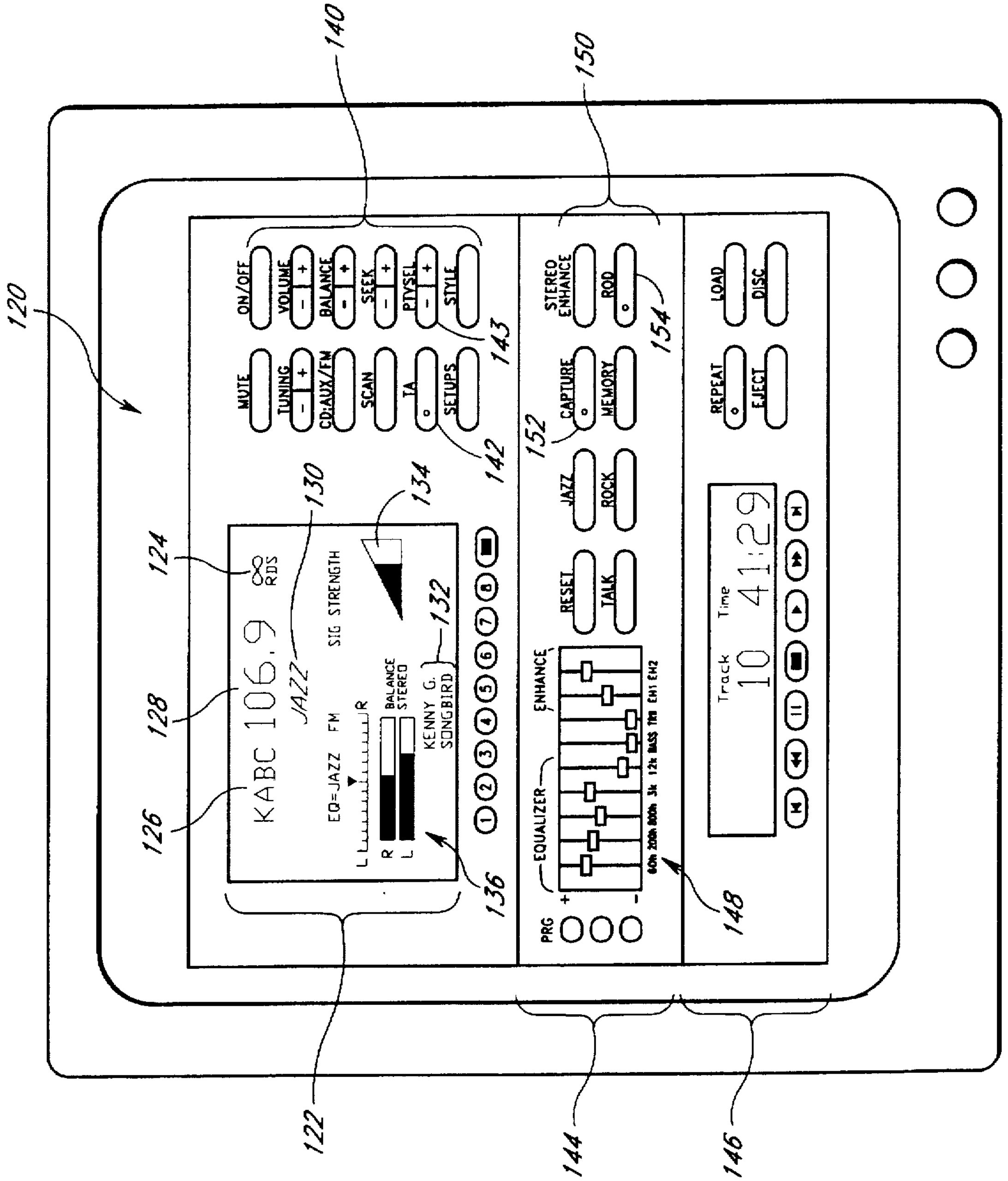
FIG. 4 is a diagram of a user display generated by a radio data reception system for use in a personal computer.

FIG. 4 depicts an example of a user display 120 for presenting FM stereo tuning information and RDS data information to an operator of the radio data reception system. The display 120 includes a dynamic display 122 for presenting station information, and information about the current song playing on the radio. An RDS indicator 124 informs the user when the system has locked on to a station transmitting RDS data. The digital data decoded by the card 40 and processed by the application software 97 is used to display station call letters 126, station frequency information 128, the music type of the station 130, and information 132 relating to the particular song playing on the radio. An indication of station signal strength 134 and VU level indicators 136 are also displayed.

Traditional stereo tuning options are graphically displayed through a series of user "buttons" 140, or icons, which can be selected and operated by a mouse. These include automatic station scan, seek, RDS station seek, tuner presets, station memory, and mute and balance controls. The FM graphical receiver also has the capability to act as an alarm clock or a sleep timer.

In addition, one of the icons 142 may be selected to quickly access traffic information. For example, when a RDS-equipped radio station is transmitting traffic information, a corresponding digital code is sent by the station in RDS format to indicate that traffic information is being broadcast. Upon selecting the icon 142, the radio data reception system disclosed herein will scan for radio stations which are transmitting traffic information. This feature is accomplished by the application software 97 which tunes successive RDS stations and checks for traffic information. Specifically, the application software will check for the group type number "8" as disclosed above in Table I. This allows a user to quickly access the desired information. The radio data reception system can also be programmed to automatically unmute the radio when a traffic announcement is broadcast, automatically pause a CD playing in the background when the traffic information is present, or store the traffic announcement to a storage device. If desired, other similar search and storage functions can also be programmed into the radio data reception system for the remaining group types listed in Table I. For example, if a user would like to search for any emergency broadcasts, the radio data reception system could be programmed to scan through station broadcasts to search for group type "9". This function can even be employed automatically when the radio data reception system is not actively engaged by the user. Upon receiving an emergency broadcast, the user would be interrupted by a visual or audio signal.

An icon 143 allows a user of the FM tuner to access an internal database of radio stations located across the country. Through the database, the user may select a specific city and a particular program type (PTY) of music. Once selected, the radio data system will automatically seek to a local station of the type requested.

A screen segment 144 provides an audio processing display giving the user many traditional audio adjustment options. For example, sound equalization and stereo enhancement functions are adjusted at the control panel 148. Preset equalization settings created by a user, as well as those suggested for certain types of music are accessed through the "button" panel 150 of the screen segment 144.

Two unique features of the radio data reception system selectable from the panel 150 include a radio text "capture" feature, and an audio capture or "radio on demand" feature. These features are implemented by the application software 97, and when selected, they allow a user to store digital data or audio information, respectively, directly to the hard disk or other storage device.

The radio text capture feature is operated through user selection of a graphical icon 152. When the icon 152 is selected, a menu box opens to give the user a choice to name a new text capture log, start a text capture log, end a text capture log, or view a log. During operation of the text capture feature, radio text transmitted by an RDS station is stored as a ".TXT" file which may be later viewed using standard text-viewing software such as Windows® notepad.

The Radio-On-Demand feature is operated through selection of a graphical icon 154. This feature allows a user to preprogram the radio data reception system to tune a particular radio station and store, i.e., capture, the broadcast to the hard drive, or other storage medium. In this manner, the user can set up preprogrammed start and end times and save the programmed routine for recurring radio programs. The programmed start and stop settings may be given a program name under which the captured audio information is stored. The radio-on-demand feature thus allows a user to record an audio broadcast at any time of any day. The programmability allowed with the radio-on-demand feature is similar to the programmability of modern day video cassette recorders (VCRs). The radio-on-demand feature also allows a user to instantly record a current broadcast by selecting a "record now" option displayed upon selection of the radio-on-demand icon 154.

To store an FM broadcast using the radio-on-demand feature, the audio information received by the radio data reception system is routed to a sound processing card (not shown) within the host computer. The application software 97 will instruct the sound card to digitize the audio data for routing to a mass storage device of the computer. The present invention makes use of an existing sound card because many personal computers are so equipped. It is possible, however, to construct the radio data card 40 with the necessary hardware to perform the digitization required for storage of the audio information. As can be appreciated by one of ordinary skill in the art, it is also possible to combine the functions of the radio data reception system with the functions of a sound card to create a combined radio data and sound card processing system.

In addition to the RDS data capture and audio capture features described above, the radio data reception system can capture and store MBS data as will be described in detail herein.

The display 120 also includes an optional segment 146 allowing playback of compact discs. The compact disc player is included in the application software 97 to provide a complete audio center to the user. Also, in accordance with a preferred embodiment, the user is given the option of selecting from one of several displays such as a display in the form of an old-fashioned fifties-era radio.

Figure 5:
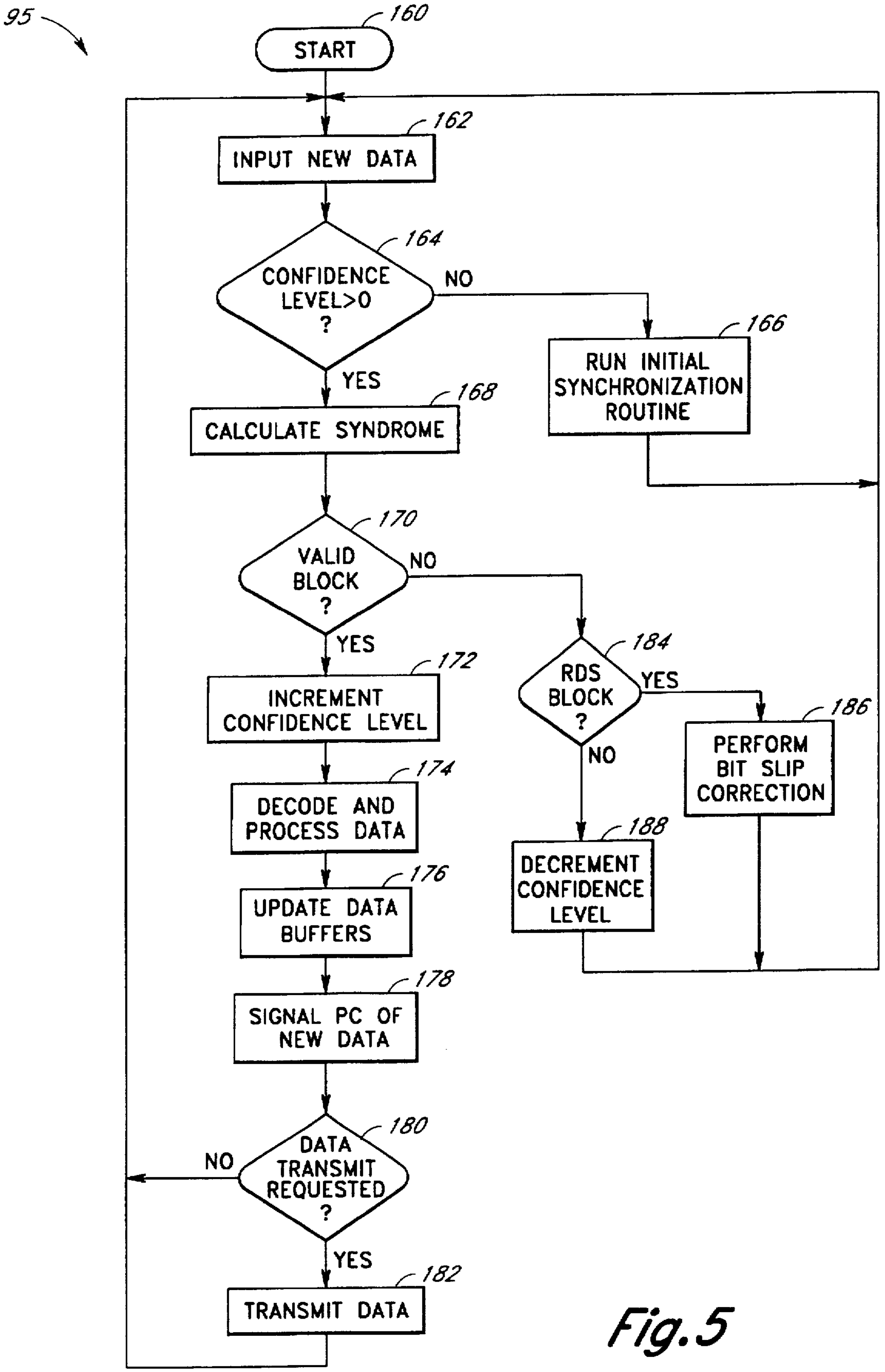
FIG. 5 is a flow chart depicting the functions performed by the microcode instructions of a radio data reception system for use in a personal computer.

As stated above in connection with FIG. 3, the operation of the radio data reception system 28 is controlled through a microcode routine 95 resident in the microcontroller 80, and through application software 97 resident in the host computer's memory. FIG. 5 is a flow chart depicting the general operations performed by the microcode routine. The microcontroller software 95 inputs and synchronizes digital RDS or MBS data, and then analyzes the data according to the RBDS standard. Before the digital data can be analyzed, it must be synchronized so that the various blocks of data can be identified.

The microcode routine 95 is initialized in a state 160 where initial parameters are set to predetermined values. One parameter discussed in connection with FIG. 5 is the synchronization confidence level which provides an indication of whether data analyzed by the microcontroller is properly synchronized. After initialization, control passes to a state 162 in which a 26-bit block of data is input into the microcontroller's memory. Control then passes to a decision state 162 where the confidence level is checked to ensure that data synchronization is established. If the confidence level is zero, then data synchronization has been lost or not yet attained. Consequently, control passes to a state 166 which performs an initial synchronization routine. The initial synchronization routine is discussed in more detail in connection with FIG. 6.

Assuming the confidence level is greater than zero, control passes to a state 168. At the state 168, a mathematical operation is performed on the 26-bit block of data in accordance with the specification of the RBDS standard. The result of this mathematical operation creates a data "syndrome" (defined in the RBDS standard) which is distinct for each of the allowable 26-bit data blocks. After calculation of the syndrome, the value of the syndrome is compared with known syndrome values in a decision state 170. If the result returned in the state 168 corresponds to a known syndrome, then a valid block of data has been detected. Accordingly, control passes to a state 172 which increments the synchronization confidence level. In accordance with a preferred embodiment, the confidence level will vary between zero and some predetermined maximum value.

After updating the confidence level in the state 172, control passes to a state 174 where the block of data is decoded and processed in accordance with the specification of the RBDS standard. In this step, the block of data and its corresponding group type are identified as discussed in connection with FIG. 2. Once identified, the data can be routed to the proper storage registers which may include separate locations for the various group types listed in Table I. As discussed in the RBDS standard, some RDS group types listed in Table I are uniquely coded by the transmitting station. These group types include the Transparent data group 5 listed in Table I. The microprocessor 80 may be programmed to decode and process a specific usage of RDS data, such as a Transparent data group and place the data in a specified register.

Alternatively, information from special data groups, like the Transparent data group, can be sent to the host computer for proprietary processing by the application software 97. In such a case, the application software 97 will instruct the microcontroller 80, via the $I^2C$ bus, to transmit these special data groups.

After the data is processed in the state 174, control passes to a state 176 where the RDS information is stored in the appropriate register locations of the microcontroller 80. In a preferred embodiment of the radio data reception system, memory locations in the microcontroller are reserved for Radio Text, Program Segment Name, Program Type Name, Clock Time Data Information, Slow Labeling Codes, PI Code, PTY Code, Enhanced Other Network Groups, and assorted control flags such as Alert indication, and Traffic flags. Presently, these are the most widely used groups for RDS data transmission and each has a dedicated memory space. Other groups, such as the Transparent data group, Radio Paging, or In-House Applications, are stored in an internal queue of the microcontroller 80 when the user desires access to them. If any of these special group types are desired, the user can instruct the microcontroller 80 to queue these groups for later retrieval.

Once the data is placed in the microprocessor's internal registers, control passes to a state 178 which signals the host computer that data is available for transmission. After the computer is signalled of the new data, control then enters a decision state 180 to determine if digital data transmission has been requested by the application software 97. If data transmission is requested, control passes to a state 182 and then back to the state 162 after transmission of the appropriate data. If data transmission is not requested by the application software, control is transferred directly from the state 180 to the state 162.

Within the state 178, the RBDS microcontroller 80 may notify the host computer of new data through an interrupt method or through the use of polling flags. The interrupt method generates interrupt requests via signal paths 72 (shown in FIG. 3) to signal the host computer when data is available. When an interrupt signal is generated by the microcontroller 80, status and data information is simultaneously transferred from the data and status ports and presented to the bus 60 along the signal lines 74 (shown in FIG. 3). The polling method uses no interrupts but does make the data and status information available to the bus 60 in a similar manner. Under the polling method, the application software 97 performs a polling operation of signal lines 74 to check for the presence of new data.

The interrupt and polling methods each offer distinct advantages. The polling method allows the host computer to receive new data only when desired and avoids any conflicts with other PC devices which may be using the same interrupts. The interrupt method, however, ensures that important events will not be missed by the host computer.

In a preferred embodiment of the present invention, the microcontroller 80 may be instructed by the application software 97 to operate in either the interrupt mode or the polling mode. When the polling mode is initially selected by the application software, a polling-mode flag is set through the $I^2C$ bus which tells the microprocessor 80 to write the status information to the data port and the status port. The microcontroller 80 waits for instructions from the $I^2C$ bus master before placing data on the data and status ports.

Information transmitted under the RDS standard, such as a song title, may be rebroadcast several times in a short period by the transmitting radio station. In accordance with a preferred embodiment, a polling flag is set to signal the presence of information only when new digital data for a given data group has been received by the microcontroller 80. This advantageous feature saves valuable processing time and avoids the need for the application software to reprocess the same data. Accordingly, in the polling mode, the application software 97 of the host computer will check the status information periodically and take action only when a flag state changes. The action taken by the application software 97 may be a request to the microcontroller 80 to present data of a specific group type to the host computer bus 60.

Transmission of the digital data in the state 182 occurs over the signal lines 74 (shown in FIG. 3) and includes the actual data as well as corresponding data identification information. After all requested data of a particular group type is transmitted, an endflag identification is presented to the host computer over the bus 60. The microcode flow then returns to the state 162 to again begin the sequence of reading, processing and outputting new data.

Referring again to the decision state 170, if a valid block of data is not detected, control passes to another decision state 184 where it is determined what type of data block, either RDS or MBS, is expected. This determination is made by checking whether RDS or MBS synchronization was previously attained in the synchronization state 166. A more detailed discussion of the steps in obtaining RDS or MBS synchronization is discussed in FIG. 6.

If the data block analyzed in the step 184 is an RDS data block, control transfers to an activity state 186 where a "bit slip" correction routine is run. The bit slip correction routine is an operation to quickly regain synchronization of RDS data. The bit slip correction routine recognizes that, under the RBDS standard, each transmitting station is identified by a specific program identification (PI) code. The PI code is a 16-bit data segment located in the first block, i.e., an "A" block, of each data group. Accordingly, when an RDS block is expected but a valid block was not detected, the microcontroller 80 will look for a 16-bit PI code which matches the PI code stored for the currently-tuned radio station. Once the PI code is found in the incoming data, a syndrome calculation is performed to verify that the PI code was part of an expected "A" block of data. If an "A" block is detected, then synchronization is reestablished. This bit-slip correction method saves time by instantly reestablishing synchronization instead of waiting until the confidence level drops to zero.

If the data analyzed in the decision state 184 is MBS data, then control passes to a state 188 which decrements the synchronization confidence level. Control then passes again to the state 174 for decoding of the data. Even though the syndrome calculation for this block of data was not known, decoding may still be possible if the invalid block detection was the result of minor transmission errors. However, if MBS synchronization is completely lost at this point, then the confidence level will eventually decrease to zero at which point the initial synchronization routine of the state 166 will be triggered.

Figure 6:
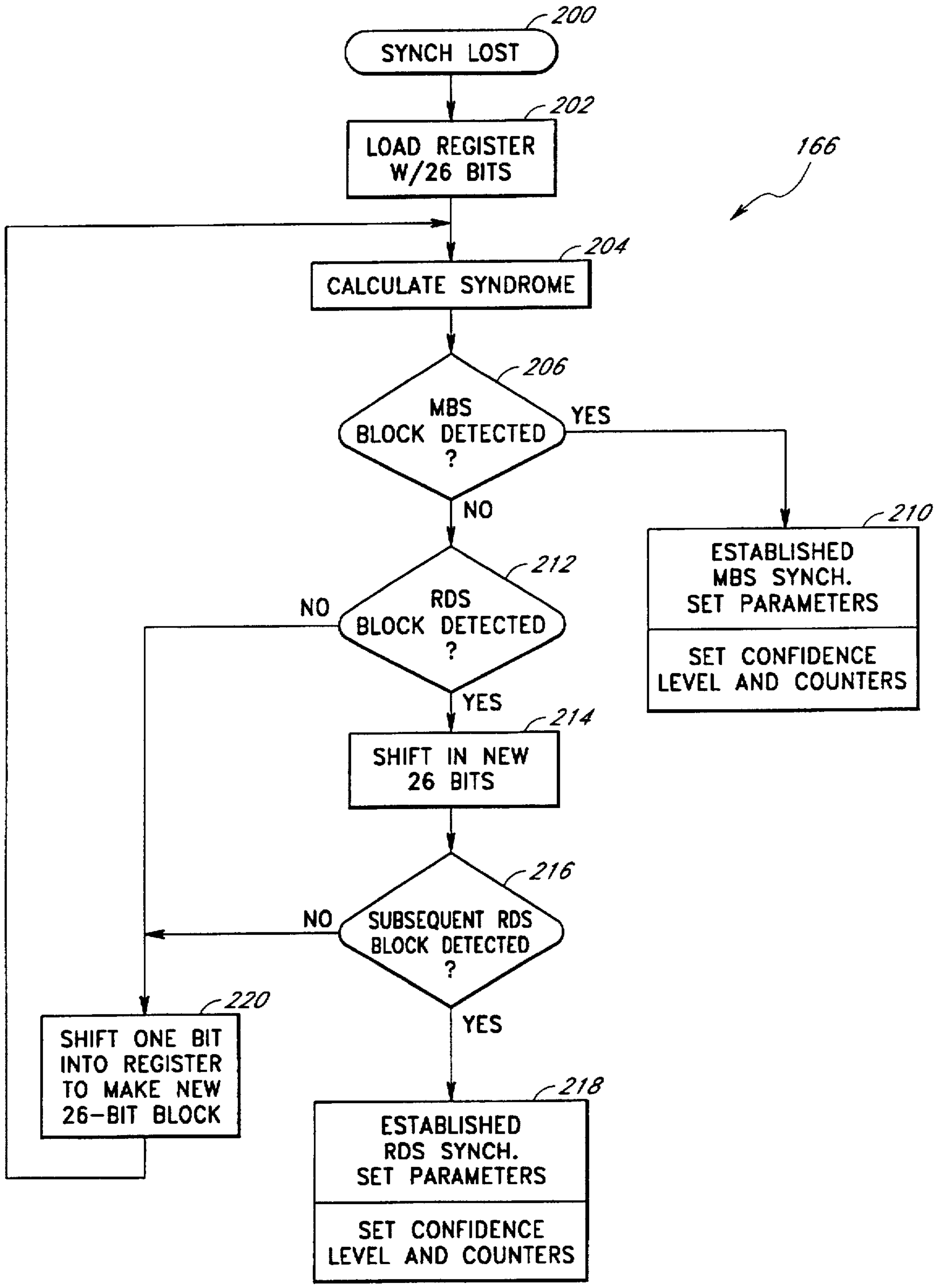
FIG. 6 is a detailed flow chart of the initial data synchronization process performed by a radio data reception system for use in a personal computer.

FIG. 6 is a flow chart depicting the operations performed by the microprocessor 80 in obtaining data synchronization in accordance with the state 166 of FIG. 5. In a preferred embodiment of the present invention, the microcontroller 80 has the ability to detect either RDS or MBS data. The microcontroller 80 can instantly and automatically switch from decoding MBS to RDS.

From an initial start state 200, operational control proceeds to a state 202 where 26 data bits are loaded into an internal register of the microcontroller 80. Control then moves to an activity state 204 where a mathematical syndrome is calculated for the 26-bit packet of data. The RBDS standard specifies certain syndromes which identify each of the five RDS data blocks that exist for the various RDS group types. In the case of MBS data, only a single MBS syndrome exists under the RBDS standard for all MBS 26-bit blocks.

To identify the 26-bit data block within the microcontroller register, control is first transferred to a decision state 206 to check if the syndrome corresponds to an MBS block. If such a syndrome is detected, MBS synchronization is established and control is transferred out through a path 208 into an activity state 210. Within the state 210, various parameters such as applicable polling flags are set to indicate that new data is available for the host computer. In addition, the synchronization confidence parameter is set at an initial value, and appropriate counters are set to properly track the successive 26-bit data blocks. After the state 210, control returns to the state 162 of FIG. 5 where a new 26-bit stream of data is input by the microcontroller 80.

If the answer to the decision state 206 is no, then control proceeds to a decision state 212 to determine if a valid RDS block has been detected. In general, RDS synchronization is achieved by detecting 2 consecutive RDS blocks in the correct order. If the first RDS data block is detected, then control transfers to an activity state 214 where a new 26 bits are loaded into the register of the microcontroller 80. A new syndrome is calculated and control transfers to a decision state 216 to verify the existence of a subsequent RDS data block. Assuming the expected second RDS data block is received and validated, control transfers to an activity state 218 and RDS synchronization is established. As with the activity state 210, the microcontroller 80 sets appropriate status polling flags to indicate the presence of new RDS data, sets the confidence level at an initial value, and also sets appropriate bit counters.

Once synchronization has been established by the microcontroller 80, a new syndrome is calculated only every 26 bits. Referring again to FIG. 5, this means that 26 bits at a time are input in the state 162. This avoids needless syndrome calculations on every new 26-bit block created after individual bits are shifted into the microcontroller's register. The RBDS standard specifies that syndrome calculation of data blocks must occur within the RBDS data-clock period to avoid missing incoming bits of data. By performing the syndrome calculation only once every 26 bits after synchronization is established, the present invention preserves machine cycles allowing a slower, more inexpensive microcontroller to be used.

Referring back to the state 212 of FIG. 6, if a recognized block is not detected, control transfers to an activity state 220. Within the state 220, one RDS data bit is shifted into the microcontroller register to make a new 26-bit data block which consists of 25 of the previous bits. Control then proceeds back to the state 204 where a new syndrome is calculated. Until synchronization is achieved, the calculated syndrome is cleared as each new bit is received. This process is repeated until a known syndrome is detected indicated the existence of a valid block. The routine then continues to check for a subsequent valid data block.

Figure 7:
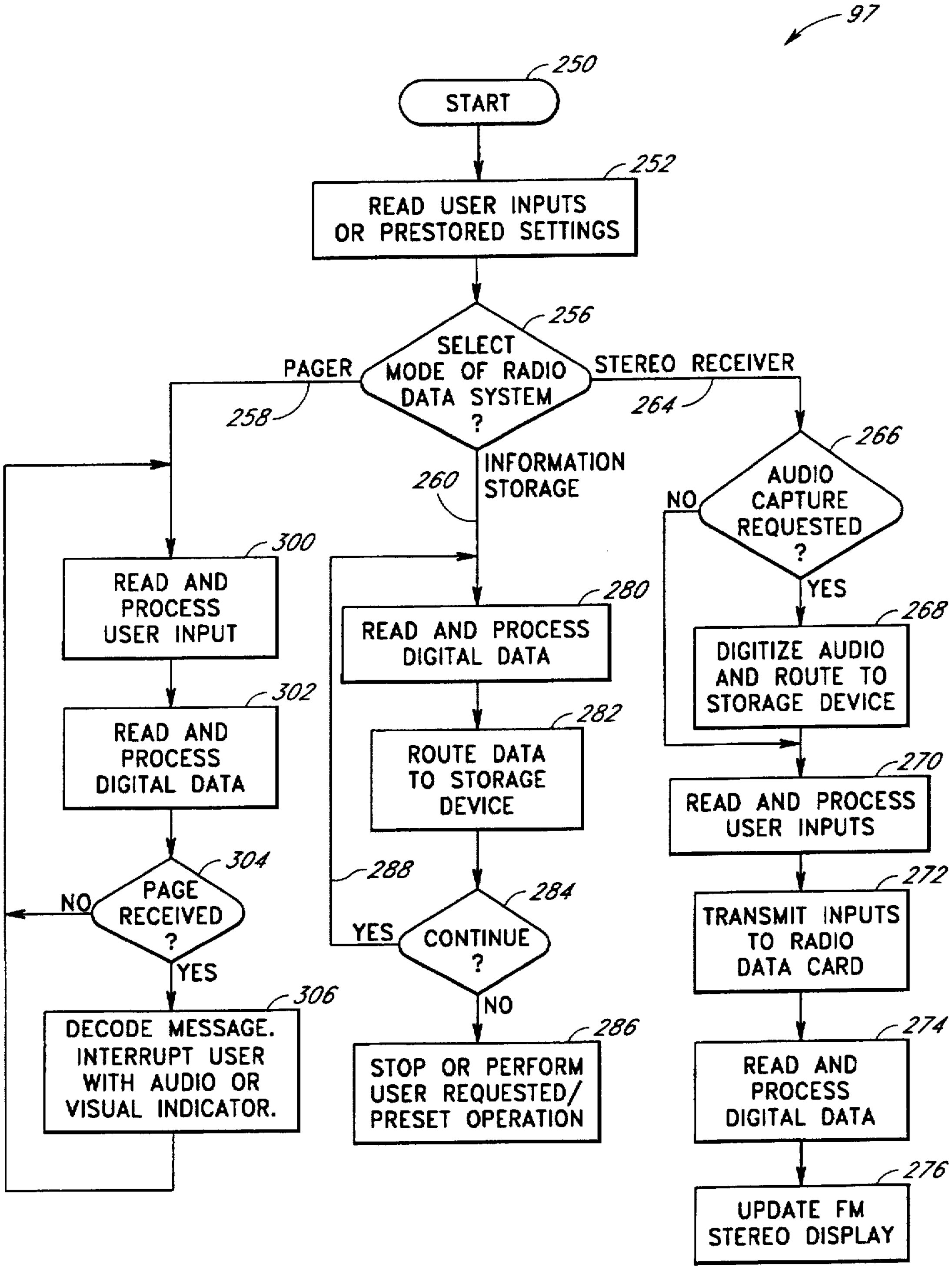
FIG. 7 is a flow chart depicting the functions performed by the application software of a radio data reception system for use in a personal computer.

The function of the microcode routine of the microcontroller 80 inputs, processes, stores and outputs data. The microcontroller operates in cooperation with the application software 97 to present data requested by the application software. FIG. 7 is a flow chart depicting the operations of the application software of a radio data reception system. The application software is to be operated by the host computer system which incorporates the radio data processing card 40.

The application software begins in a start state 250. Within the state 250, user parameters are initialized and the requested method of data transmission is sent to the microcontroller 80, i.e., either the interrupt or polling-flag method. From the state 250, control immediately passes to an activity state 252 where inputs from a user are read by the application software 97.

In addition to user inputs, prestored operational settings may be read by the application software in the state 97. Such prestored settings are used in an automatic mode of operation for the radio data reception system. For example, the application software 97 may have been previously programmed, via user selection of the "radio-on-demand" function, to capture certain radio information at a designated time. Other prestored settings include those required to automatically seek to an FM paging station and begin listening for pages, or automatically begin decoding and storing digital data at a certain frequency. In essence, any function which can be user controlled can be preprogrammed in accordance with a preferred embodiment to allow a user complete flexibility. Because today's computers allow multi-tasking of operations, the application software of the present invention can be operating in the background to perform the automatic functions while a user operates an entirely different program.

From the state 252, control passes to a decision state 256 in which the user selects the mode of operation of the radio data reception system. Specifically, the user may select to operate the system as a stereo receiver, in which case control is transferred along a path 264. Alternatively, the user may select a paging mode, in which case control is transferred along a path 258, or the user may select an information receipt and storage mode, in which case control is transferred along a path 260. When the radio data reception system is operate automatically by the application software, the mode of operation is likewise chosen automatically.

Selection of the stereo reception mode means that the data reception system will be interpreting RDS data. Conversely, selection of the paging and information modes mean that the system will be interpreting MBS data. Because user selection may require the decoding of MBS or RDS data, the present invention advantageously incorporates a unique dual (RDS and MBS) detection microcode routine within the microcontroller 80. Accordingly, if a transmitting radio station is broadcasting RDS and MBS data in a multiplexed format, the radio data reception system may be programmed to operate in more than one mode simultaneously in order to decode the differently-formatted data. The processing capabilities of a host computer system used with the radio data reception system make such dual mode processing practical. Moreover, such a system is suitable for use with a network of broadcasting stations which transmit digital information on FM signals over a wide area.

In the stereo reception mode, control of the application software 97 first proceeds to a decision state 266 where it is determined if the user is requesting storage of the analog audio information. If storage, or "capture", is requested within the state 266, control transfers to a state 268 to initiate the instructions necessary to accomplish this task. As stated earlier, storage of audio is executed with the help of a sound card or it may be executed entirely by the radio data card 40 in connection with the application software 97. When a sound card is used for this purpose, audio information is routed from the unprocessed line "B" (shown in FIG. 3) directly to the "line-in" of a sound card (not shown).

Upon exiting the state 268, or if radio capture is not requested, control passes to a state 270 where various user inputs are read and processed. In the stereo reception mode, such inputs include those features shown in connection with FIG. 4, such as tuning information, volume control, audio adjustment parameters, etc. From the state 270, control passes to a state 272 in which the stereo user input parameters are transmitted to the radio data card 40.

The digital RDS data associated with the tuned station is next read and processed in an activity state 274. The method of accessing this data will be in accordance with either the interrupt or polling methods previously discussed in connection with FIG. 5. Once the digital data is received and processed within the state 274, control passes to a state 276 in which the graphical display is updated with the new RDS data. The stereo receiver mode continues to operate in the loop between states 266 and 276 until the user selects a new mode of operation for the FM data reception system.

Referring back to the decision state 256, if the information storage mode is selected, control passes to an activity state 280. Within the state 280, MBS data is received and processed. Control then transfers to a state 282 where the data is captured, i.e., the date is routed to a storage device selected by a user. Packets of the MBS data can then be assembled into complete files by the application software 97. Because MBS data does not have a standardized data-encoding format like that of RDS, large amounts of information can be transmitted in successive MBS data blocks. Such information is chosen by a transmitting radio station and may include, for example, weather information, stock and business information, news reports, video images, etc. In fact, virtually anything which is capable of transmission over the various on-line services such as Compuserve, can also be transmitted in an MBS data format.

In a preferred embodiment, the application software 97 will incorporate proprietary decoding routines to recognize certain types of MBS data transmitted by selected radio stations. Once identified, the application software can properly decode and format the data for later use. This data can then be permanently stored as indicated in the activity state 282. After storage of the data, control of the software transfers to a decision state 284 to determine if further MBS data will be received and stored. If MBS data receipt and storage is continued, the process continually repeats through the states 280, 282, and 284. When the information transfer process is complete, control transfers to a state 286 in which further instructions from the user, or prestored instructions, are executed. For example, the user at this time may wish to view the assembled MBS data on a monitor of the host processing system.

MBS data reception and storage offers a unique and advantageous way to deliver the same information to a large group of recipients, or in the alternative to deliver information to a selected group of recipients. The number of people receiving the information will be limited to those who contain proprietary software to decode the MBS data.

Transmission of MBS data is relatively slow compared to the speed of other computer functions or data transfer from on-line services. Accordingly, the time required for large-volume transfers of MBS data may take several minutes or hours. The present invention takes advantage of the multi-tasking capabilities of modern computers to allow MBS information receipt and storage concurrently with other computer functions. Thus, a user of the radio data reception system can be receiving and downloading information at the same time the user performs an entirely different operation, such as word processing or creation of a spreadsheet. Moreover, a user's personal computer may be left in the MBS information receive mode for extended periods of time, such as overnight, to receive large volumes of information for later use. To facilitate data receipt, the radio data reception system may be preprogrammed to turn on and off to accommodate a user and access only desired information.

The receipt of MBS information assumed, of course, that such information is being transmitted by a local FM station. It is conceivable that many FM stations will use such methods in the future to transmit the MBS information contemplated. Also, radio stations which typically transmit RDS data or MBS paging information may choose to transmit general MBS information during inactive digital data transmission periods. The limitations on this type of data transfer are in effect determined only by the application software which must recognize and format the MBS data received.

The final mode of operation of the radio data reception system is a page receive mode. Referring again to the state 156, process control of the paging mode begins at a state 300 in which MBS data corresponding to an FM page is read and processed by the application software 97. Control then passes to a decision state 304 in which a simple comparison is made between the page information received and the paging code of the user. If the received data matches the user's paging code then a valid page was received and control passes to a state 306. Within the state 306, the page message is decoded and displayed to the user on the monitor 24. If the user is operating a separate piece of software when the page is received, such as a word processing application, the application software will generate an audio signal to inform the user of the incoming page. If a page was not received, as determined within the state 304, then control returns to the state 300 and any subsequent MBS data is interpreted by the application software. Alternatively, the user's paging code may exist within the microcontroller 80. Thus, the operations performed in the states 300, 302, and 304 of the application software may instead be programmed into the microcode routine 95 allowing the microcontroller 80 to detect when a page has been received and set a flag to signal the host computer. This alternative processing method reduces the demands placed on the host computer which may be advantageous to the user.

Figure 8:
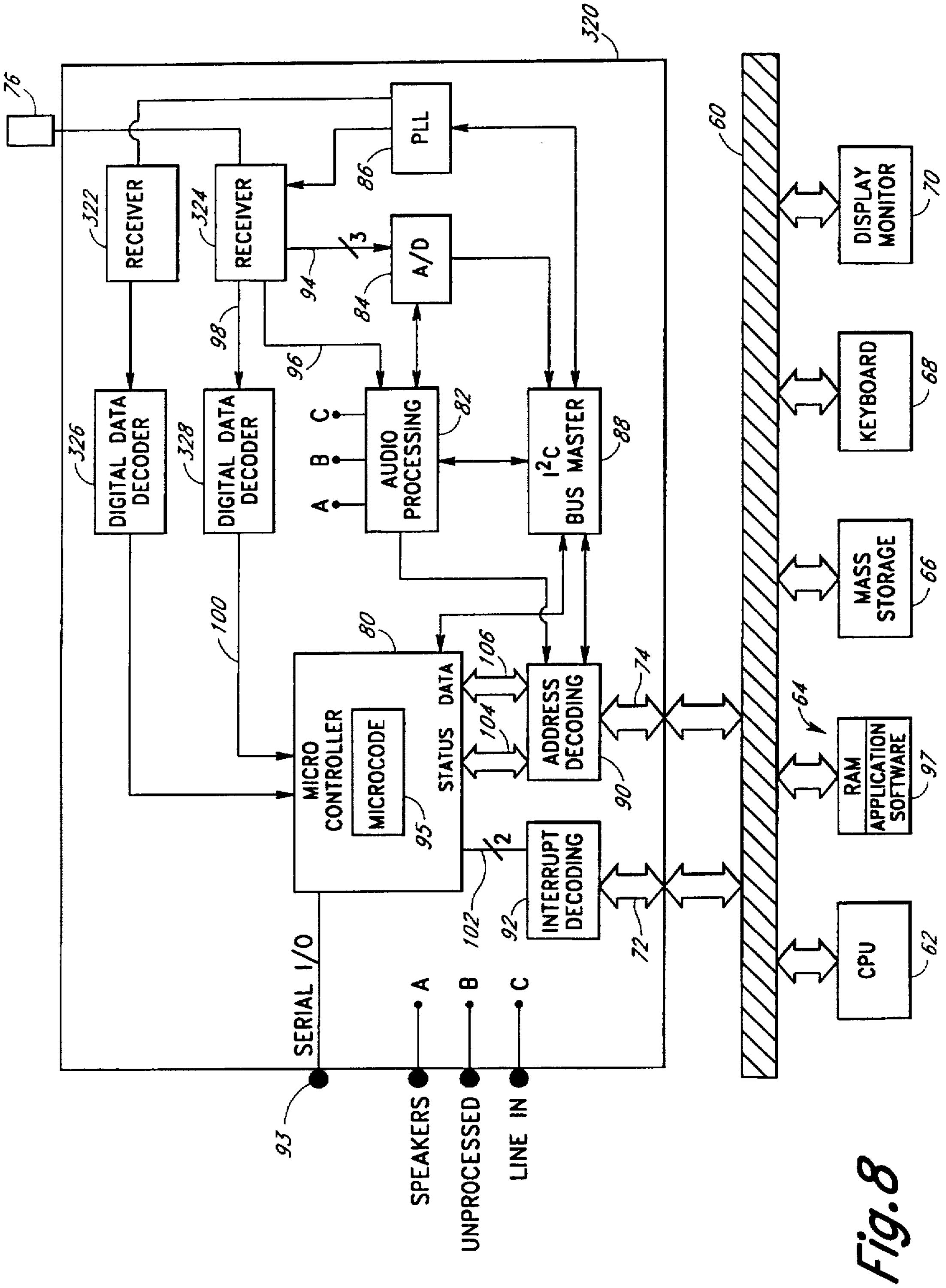
FIG. 8 is a schematic block diagram of an alternative embodiment for a radio data reception system having multiple FM tuners and data decoders for use in a personal computer.

FIG. 8 depicts an alternative embodiment of the present invention employing multiple FM tuners. An alternative embodiment for a radio data reception system has a tuning and data decoding card 320 upon which are mounted first and second FM receivers 322 and 324. The first receiver 322 and the second receiver 324 are connected to corresponding digital data decoders 326 and 328. In the multiple receiver embodiment of FIG. 8, the first and second receivers 322 and 324 each have the capability to receive either MBS or RDS data. Thus, the user may select any two modes of operation to run simultaneously. If one of the modes selected is the stereo tuner mode, the second receiver 324 performs this dedicated function via connection to the remaining audio processing components of the card 320. In this alternative embodiment, the microcontroller and application software functions are expanded to handle the dual data reception and processing required.

Through the foregoing description and accompanying drawings, the radio data reception system has been shown to have important advantages over current systems found in the prior art. It can be appreciated by a person of ordinary skill in the art that the present invention may be implemented in a number of ways using various circuit components. For example, the radio data reception system may be implemented using a digital signal processor or a field-programmable-gate-array (FPGA) to perform audio and digital data processing functions.

While the above detailed description has shown, described, and pointed out the fundamental novel features of the invention, it will be understood that various omissions and substitutions and changes in the form and details of the device illustrated may be made by those skilled in the art, without departing from the spirit of the invention. Therefore, the invention should be limited in its scope only by the following claims.

We claim:

1. A radio reception system that imparts at least FM stereo functionality to a general purpose computer, the general purpose computer including a processor, a display monitor and a set of audio speakers, the system comprising:

a card that attaches to and communicates with the general purpose computer, the card including FM receiver circuitry that receives a broadcast FM signal and extracts a stereo audio signal therefrom, the card further including an audio port that is coupled to the FM receiver circuitry, the audio port providing access to the audio signal to allow the audio signal to be routed to and played on the audio speakers, the card further including an analog-to-digital (A/D) converter coupled to an output of the FM receiver circuitry, the A/D converter configured to digitize the audio signal to produce a digital audio signal, the card configured to transfer the digital audio signal to the general purpose computer; and application software that runs on the processor of the general purpose computer and communicates with the card to control an operation of the card, the application software implementing a graphical user interface that provides functionality for enabling a user of the general purpose computer to control and monitor the operation of the card using the display monitor, the graphical user interface including tuner controls that allow the user to interactively control the FM receiver to tune into and listen to selected FM radio stations.

2. The radio reception system of claim 1, wherein the application software provides functionality for allowing the user to selectively store a segment of the digital audio signal to a memory of the general purpose computer for subsequent playback.

3. The radio reception system of claim 1, wherein the card is configured to plug into a standard expansion slot of the general purpose computer.

4. The radio reception system of claim 1, wherein the card is configured to connect to an external communications port of the general purpose computer.

5. The radio reception system of claim 1, wherein the FM receiver circuitry includes digital data decoder circuitry that extracts digital message data from a broadcast FM signal and transfers the digital message data to the general purpose computer, and wherein the application software displays at least some of the digital message data to the user via the graphical user interface.

6. The radio reception system of claim 5, wherein the digital data decoder is configured to extract digital message data that is formatted according to at least one of the RDS standard and the MBS standard.

7. The radio reception system of claim 5, wherein the FM receiver circuitry concurrently extracts the audio signal and the digital message data from broadcast FM signals to allow the user to monitor data broadcasts while listening to audio broadcasts.

8. The radio reception system of claim 1, wherein the card further includes audio signal processing circuitry that processes the audio signal, the audio signal processing circuitry controllable from the graphical user interface to allow the user to interactively adjust sound characteristics of the audio signal.

9. The radio reception system of claim 1, wherein the FM receiver circuitry includes first and second FM receivers, and wherein the card and the application software are configured such that the user can independently control the first and second receivers.

10. A general purpose computer that includes functionality for implementing an FM stereo tuner, the computer comprising:

a computer processor operatively coupled to a display monitor, a memory, and a set of audio speakers;

FM receiver circuitry operatively coupled to the computer processor, the FM receiver circuitry configured to extract a stereo audio signal from an FM broadcast transmission, the receiver circuitry coupled to the audio speakers to provide the audio signal to the speakers for audible playback;

an analog-to-digital (A/D) converter coupled to an output of the FM receiver circuitry, the A/D converter configured to digitize the audio signal to produce a digital audio signal, the A/D converter coupled to the computer processor to transfer the digital audio signal to the computer processor; and application software which is stored in the memory and executed by the processor, the application software configured to control an operation of the FM receiver circuitry, the software implementing a graphical user interface that provides functionality for enabling a user of the general purpose computer to control and monitor the operation of the FM receiver circuitry to tune into and listen to selected FM radio stations.

11. The general purpose computer of claim 10, wherein the application software provides functionality for allowing the user to selectively store a segment of the digital audio signal to the memory.

12. The general purpose computer of claim 10, wherein the FM receiver circuitry is provided on a card the plugs into a slot of the computer and communicates with the computer processor.

13. The general purpose computer of claim 12, wherein the card provides functionality for implementing a general purpose personal computer sound card.

14. The general purpose computer of claim 10, wherein the FM receiver circuitry includes digital data decoder circuitry that extracts digital message data from a broadcast FM signal, and wherein the application software displays at least some of the digital message data to the user via the graphical user interface.

15. The general purpose computer of claim 14, wherein the digital data decoder is configured to extract digital message data that is formatted according to at least one of the RDS standard and the MBS standard.

16. The general purpose computer of claim 14, wherein the FM receiver circuitry concurrently extracts the audio signal and the digital message data from broadcast FM signals.

17. The general purpose computer of claim 10, wherein the FM receiver circuitry further includes audio signal processing circuitry that processes the audio signal, the audio signal processing circuitry controllable from the graphical user interface to allow the user to interactively adjust sound characteristics of the audio signal.

18. The general purpose computer of claim 10, wherein the FM receiver circuitry includes first and second FM receivers, and the application software is configured to allow the user to independently control the first and second receivers.

19. A radio data reception system for receiving a group of FM broadcast signals having digital data modulated on subcarrier signals of said group of FM broadcast signals, said radio data reception system comprising:

a tuner for selecting and receiving a desired FM broadcast signal from said group of FM broadcast signals;

a decoder for demodulating digital data transmitted on a subcarrier frequency of said desired FM broadcast signal;

a microprocessor receiving said digital data from said decoder, said microprocessor comprising means for detecting RDS digital data and MBS digital data, said means for detecting initiating a first set of processing instructions when said digital data is RDS digital data and said means for detecting initiating a second set of processing instructions when said digital data is MBS digital data; and interface means for transmitting said digital data to a host processing system, said interface means signalling said host processing system when said digital data is available for transmission by setting a flag indicating the presence of said digital data;

wherein said digital data is divided into separate data types each having a corresponding flag, said setting of said flag for a data type occurring when new digital data is received for said data type, and wherein said host processing system ignores said data type when said flag is not set.

* * * * *